(12) United States Patent
Osman

(10) Patent No.: US 10,530,818 B2
(45) Date of Patent: Jan. 7, 2020

(54) SERVER-BASED SOUND MIXING FOR MULTIUSER VOICE CHAT SYSTEM

(71) Applicant: Sony Computer Entertainment Inc., Tokyo (JP)

(72) Inventor: Steven Osman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 793 days.

(21) Appl. No.: 15/084,644

(22) Filed: Mar. 30, 2016

(65) Prior Publication Data

US 2017/0289209 A1 Oct. 5, 2017

(51) Int. Cl.
*G10L 19/008* (2013.01)
*H04L 29/06* (2006.01)

(52) U.S. Cl.
CPC .......... *H04L 65/403* (2013.01); *G10L 19/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,392,355 B1* | 7/2016 | Kulavik | | H04R 1/1091 |
| 2008/0187143 A1* | 8/2008 | Mak-Fan | | H04M 3/56 |
| | | | | 381/17 |
| 2009/0113066 A1* | 4/2009 | Van Wie | | H04L 12/1827 |
| | | | | 709/231 |
| 2009/0189830 A1* | 7/2009 | Deering | | G09G 3/02 |
| | | | | 345/1.3 |
| 2015/0013531 A1* | 1/2015 | Buskies | | G10H 1/04 |
| | | | | 84/633 |
| 2015/0256613 A1* | 9/2015 | Walker | | H04L 67/32 |
| | | | | 709/217 |
| 2015/0373477 A1* | 12/2015 | Norris | | H04M 1/72572 |
| | | | | 381/303 |
| 2017/0171685 A1* | 6/2017 | Ballard | | H04S 7/303 |

* cited by examiner

*Primary Examiner* — Abul K Azad
(74) *Attorney, Agent, or Firm* — John L. Rogitz

(57) ABSTRACT

One or more chat servers receives voice signals and pose (location and orientation) signals from devices such as VR headsets associated with respective chat participants. For each participant, the server renders a single stream representing the voices of the other participants, with the voice data in each stream being modified to account for the orientation of the head of the receiving participant. The server sends the streams to the participants for whom the streams are tailored. The voice information representing the chat of the other participants in a stream intended for a particular participant can also be modified to account for the distances between participants and orientations of speakers' heads relative to the particular participant for whom the stream is tailored.

19 Claims, 7 Drawing Sheets

Participant-side Logic

Server Logic

Augmented Logic for
Participant Velocity, Acceleration

Alternate Server Logic

SERVER-BASED SOUND MIXING FOR MULTIUSER VOICE CHAT SYSTEM

TECHNICAL FIELD

The application relates generally to server-based sound mixing for multiuser voice chat systems.

BACKGROUND

Multiuser voice chat systems may involve multiple computer game participants playing a computer game and chatting with each other during game play. Regardless of the setting, when multiple people are using voice chat, one approach would be to have every person broadcast to every other person, e.g., in the game, but as understood herein, this would quickly cascade the number of audio streams being transmitted back and forth.

SUMMARY

Accordingly, present principles enable each device of each of multiple (e.g., ≥2) chat users such as may be engaged together in playing a computer game to transmit that chat user's audio to a server, which mixes the audio with the audio broadcasts from the other chat users (e.g., game players) and provides a single stream to each chat user. The stream provided to each user is unique for that chat user because it does not include the chat user's own audio, but only that of the remaining chat users, and moreover from the receiving user's perspective.

Accordingly, a device includes a computer memory that is not a transitory signal and that in turn includes instructions executable by a processor to receive from respective first, second, and third participants, respective first, second, and third pose information associated with the first, second and third participants. The instructions are further executable to receive respective first, second, and third voice signals indicating speaking of the respective first, second and third participants, and for the first participant, combine the second and third voice signals but not the first voice signal into a first stream using the first pose information (such as, for example, head orientation and in some cases combined with location of the participant) associated with the first participant. The first stream is provided to a first speaker system associated with the first participant for playing thereon. Similarly, the instructions are executable, for the second participant, to combine the first and third voice signals but not the second voice signal into a second stream using the second pose information associated with the second participant, and likewise to combine the second and first voice signals but not the third voice signal into a third stream using the third pose information associated with the third participant, providing the second and third streams to second and third speaker systems associated with the second and third participants.

In some examples, the device includes a server configured for receiving the pose information and voice information from respective first, second, and third devices associated with the first, second, and third participants. The device can include a computer game apparatus associated with at least one of the participants.

In example embodiments, the instructions may be executable to modify the second voice signal for the first stream based on a distance in two dimensions or three dimensions between the first and second participants. The distance can be a distance in the physical world between the first and second participants, or it can be a distance in a virtual space between respective first and second virtual characters associated with the first and second participants.

In some implementations the instructions can be executable to modify the second voice signal for the first stream based on orientation information in the second pose information associated with the second participant.

The speaker systems may include virtual reality (VR) and/or augmented reality (AR) headsets and/or headphones connected to such headsets.

In non-limiting embodiments, the instructions can be executable to modify the second voice signal for the first stream based on a velocity associated with at least one of the first or second participants. In some non-limiting examples, the instructions can be executable to aggregate voice signals for the first stream in geometric sectors centered on a location associated with the first participant, and provide the first speaker system associated with the first participant a respective single aggregated stream for each respective sector in which a participant other than the first participant is located. The aggregated voice signals can then be modified by the first participant if desired to accommodate the listening direction of the various sectors with respect to the first participant's pose.

In another aspect, a method includes receiving voice signals from participants in a group chat, and providing to a respective device of each receiving participant in the group chat an audio stream representing voices of plural other participants in the chat modified to account for a head orientation of the receiving participant.

In another aspect a system includes one or more chat servers and plural computerized devices associated with respective chat participants and sending to the one or more chat servers respective voice signals and pose signals associated with the respective chat participants. For each chat participant, the server renders a single stream representing voices of other chat participants, with voice data in each stream being modified to account for an orientation of the head of a participant receiving the stream. The server sends each stream to the participant for whom the stream is tailored.

The details of the present application, both as to its structure and operation, can best be understood in reference to the accompanying drawings, in which like reference numerals refer to like parts, and in which:

DETAILED DESCRIPTION

Figure 1:
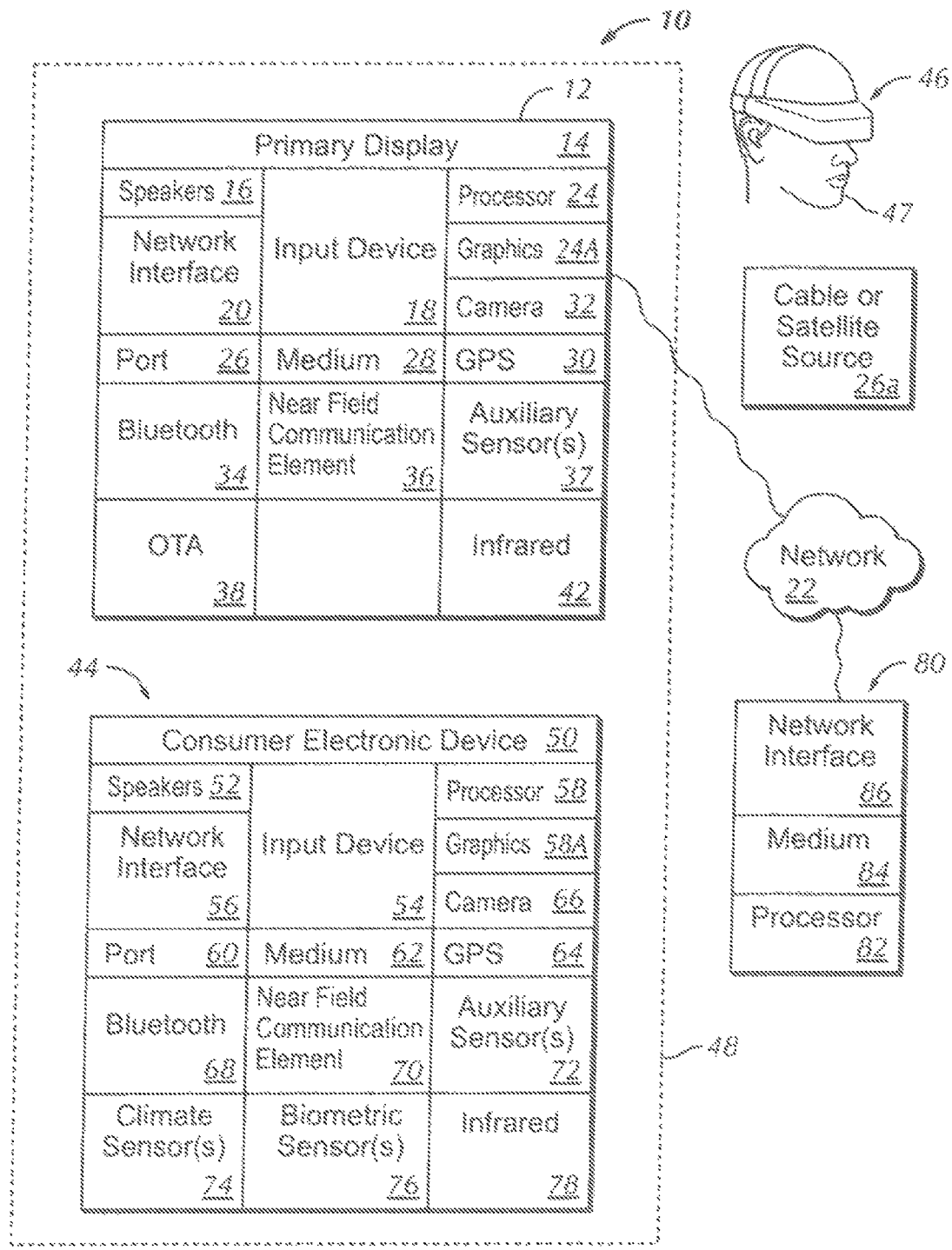
FIG. 1 is a block diagram of an example system including an example in accordance with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions, (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local internet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPEOM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication, over at least one network 22 such as the internet an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network, transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such, as, e.g., a high definition multimedia interface (HDMI) port or a USB peat to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be, e.g., a separate or integrated set top box, or a satellite receiver. Or, the source 26*a* may be a game console or disk player containing content that might be regarded by a user as a favorite for channel assignment purposes described further below. The source 26*a* when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast post 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CB device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12, as an example of a multiuser voice chat system.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interlace 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (PPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
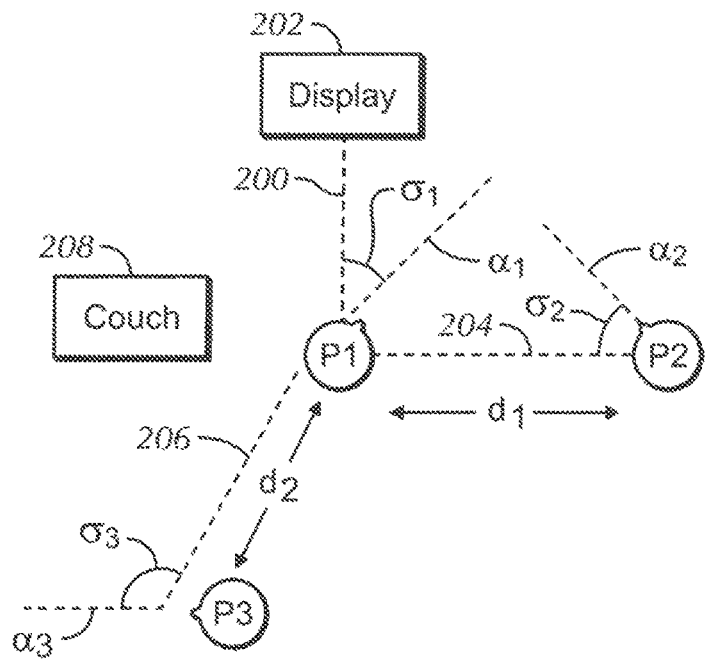
FIGS. 2 and 3 are schematic diagrams illustrating geometries between multiple chat participants to inform further disclosure.

FIG. 2 illustrates an example geometry among multiple chat users (designated players 1-3, or P1, P2, P3) to inform disclosure below. Assume P1 is the chat participant of focus, it being understood that the same principles of interrelated pose parameters can be applied to every chat user in the group.

By "pose" is meant both the geographic location of a chat participant and the orientation in one dimension and more typically in at least two dimensions (for stereo sound embodiments) and in some implementations three dimensions (for three dimensional sound embodiments) in which the participant is facing. By direction of "facing" is meant the direction of the axis that is perpendicular to the front of the participant's face. The reference may be in the physical world or in a virtual world of a computer game and, for 3D embodiments, the real or virtual horizontal plane for orientations of the participant's head in the vertical dimension. Indeed, the audio from one or more chat participants may be virtual, e.g., "voice of God", and the location of a chat participant, whether real or virtual, may be defined by the participant of focus as described further below. In general, however, the orientation used for the participant of focus is real in that it is established by the real direction in which the participant has turned his head, whether relative to a real or virtual reference, although as mentioned above the player's game character pose information may be used.

For disclosure purposes, assume that in the simplified two dimensional example shown in FIG. 2, the chat participant of focus P1 has turned his head to establish an angle $\theta_1$ between the axis $\alpha_1$ that is perpendicular to the front of the participant's face and the perpendicular 200 between the participant P1 and a video display 202, which perpendicular may be understood to represent a real or virtual reference for the orientation angle of the head of the participant of focus.

A second chat participant P2 is located a distance $d_1$ from the chat participant of focus P1 and is positioned and facing a direction in which an angle $\theta_2$ is established between the axis $\alpha_2$ that is perpendicular to the front of the face of the second chat participant P2 and the line of sight 204 between the second chat participant P2 and the chat participant of focus P1. Similarly, a third chat participant P3 is located a distance d from the chat participant of focus P2 and is positioned aid facing in a direction in which an angle $\theta_3$ is established between the axis on that is perpendicular to the front of the face of the third chat participant P3 and the line of sight 206 between the third chat participant P3 and the chat participant of focus P1. In FIG. 2, an item of furniture 208 such as a couch next to the chat participant of focus P1 is also shown for purposes to be shortly implicated.

Figure 3:
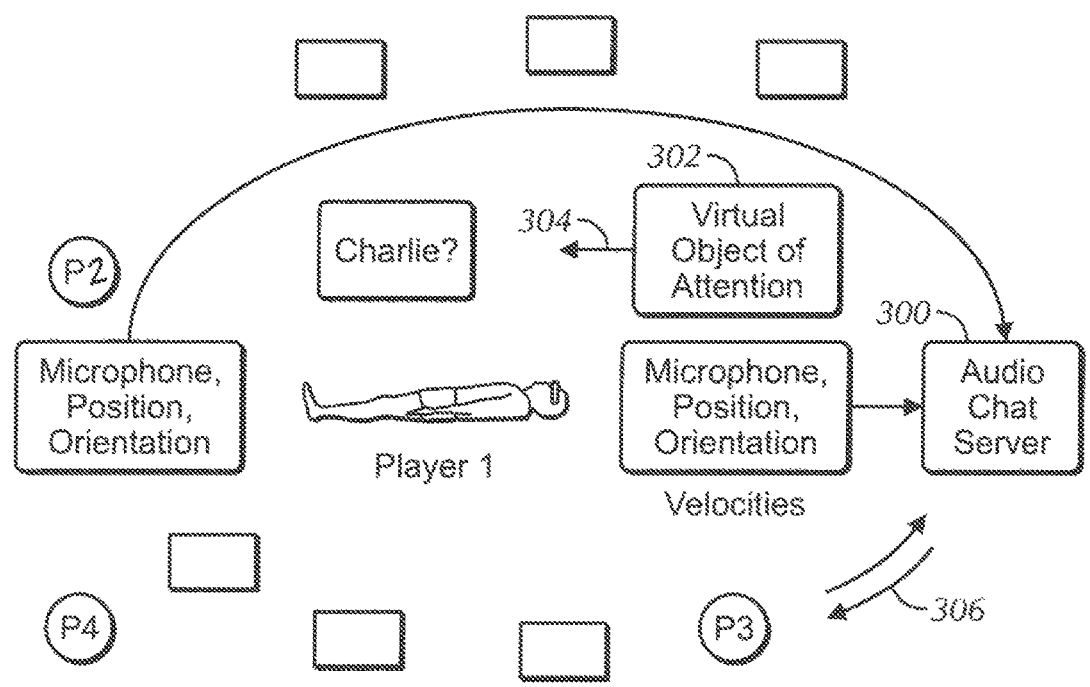

With the above in mind, FIG. 3 schematically illustrates be three chat participants P1-P3 (with the participant of focus P1 lying supine, facing up) each associated with a respective wireless communication device (WCD) that sends voice information from a respective microphone of the participant and pose information including location and head orientation of the participant to one or more local or cloud-based chat servers 300 (only a single chat server 300 shown). As mentioned above, the server 300 can be a game console associated with one of the participants. Within the area of the chat participants and assuming they are all players of the same computer game, a virtual object 302 may be moving in the direction of the arrow 304. As indicated by the return arrow 306 between the server 300 and the third participant P3, the chat server 300 sends an audio stream to each participant according to description below. The locations of each participant's microphone also may be sensed (e.g., by a position sensor on the microphone) and sent to the server to be used, e.g., as a proxy for the location of the participant, or to be used to determine, using the spherical spreading algorithm discussed below or other means, the volume of the participant's voice at the participant's mouth.

Figure 4:
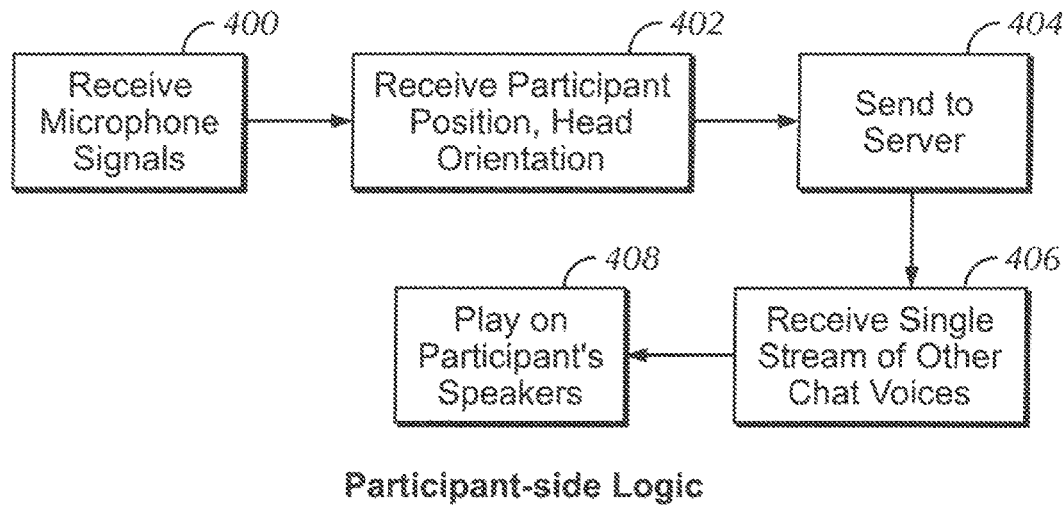
FIG. 4 is a flow chart of example participant-side logic in an embodiment.
Figure 5:
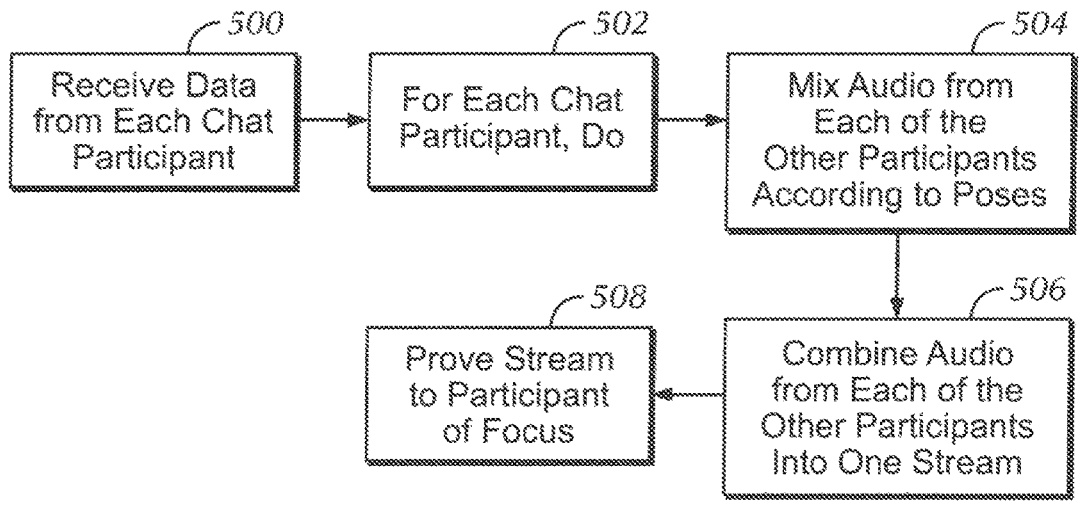
FIG. 5 is a flow chart of example server logic for the embodiment of FIG. 4.

FIGS. 4 and 5 illustrate logic for the participant side and server side, respectively, according to an embodiment. Commencing at block 400 of FIG. 4, for each chat participant, a respective device such as but not limited to a computer game headset or other device receives, from a microphone nearby the associated participant (such as on the headset), voice signals from the participant. Also, at block 403 the pose information related to the participant is received. This information can be received from a GPS sensor in the participant's device, such as his headset, in instances in which the real location of the participant is to be used, or it can be the location of the participant's character in a virtual world of a computer game, or as otherwise defined according to disclosure below. The orientation component of the pose information may be received from one or more sensors, e.g., in the headset associated with the participant, such as one or more accelerometers, gyroscopes, etc. in the headset.

Proceeding to block 404, the pose information and voice information from the microphone is sent to one or more local or cloud-based chat servers. Moving to block 406, the participant device receives back a single compressed stream from the server containing information on the voice chat of the other participants, and then decompresses, decodes, and/or plays the stream on the speakers of the device associated with the receiving participant.

FIG. 5 illustrates complementary logic of the server. Commencing at block 500, the voice and pose data is received from each chat participant. Block 502 indicates that for each of "N" chat participants, a single audio stream is generated that represents the audio from the other N−1 participants, but that omits the audio from the participant ("test participant", also referred to as the "participant of focus") for whom the stream is being tailored.

For each test participant, the logic moves to block 504 to mix the audio of the other (non-test) participants according to the pose of the test participant and in some instances according to the poses of the non-test participants according to disclosure below. This mixing can be done using 2D stereo mixing or 3D audio mixing algorithms to create a custom audio stream for the test participant. Such algorithms calculate time delays for each channel corresponding to each speaker in the test participant's device. In the ease of a headset with only left and right speakers, a binaural algorithm determines delays between the left and right channels (and in the 3D case, a 3D audio algorithm calculates delays between three or more channels) corresponding to respective speakers in the headset to present audio that is perceived by the test participant to be coming from the direction of the participant speaking the audio, given the orientation of the test speaker and modified if desired for the location and orientation of the other participant.

The audios for the non-test participants are combined into a single stream at block 506 and if desired compressed into a single stream tailored for the test participant. The single stream tailored for each test participant is then sent to that test participant at block 508 for play at block 408 of FIG. 4. Each participant thus receives a mix of the audio from all the remaining participants.

Thus, referring back to FIGS. 2 and 3, the delays for each test participant calculated by the rendering algorithm for the audio of each of the non-test participants assume that the test participant is in the pose transmitted by the test participant at block 404 of FIG. 2. For example, the delays calculated for the participant of focus P1 in the audio from the second participant P2 can account for the direction of the line of sight 204 between P1 and P2 and the orientation $\theta_1$ of the participant of focus P1 in real or virtual space. Likewise, the delays calculated for the participant of focus P1 in the audio from the third participant P3 can account for the direction of the line of sight 206 between P1 and P3 and the orientation $\theta_1$ of the participant of focus P1 in real or virtual space.

Moreover, the audio from each non-test participant may be modified to account for the location and/or orientation of that non-test participant relative to the participant of focus. For example, the amplitude of audio from speakers at relatively longer distances from the participant of focus and/or who are not facing the participant of focus can be reduced.

In an example, the amplitude of the audio of the second participant P2 in the mix intended for the participant of focus P1 in FIG. 2 can be modified by:

Amplitude=Amplitude normalized to one unit of distance $(1/d_1)^2$.

Also, the amplitude of the audio of the second participant P2 in the mix intended for the participant of focus P1 in FIG. 2 can be modified by:

Amplitude=Amplitude($|\cos \theta_2/2|$)+C, where "C" is a constant to account for the fact that a listener can typically hear at least a nominal amplitude of the voice of a speaking person even when the speaking person is turned directly away (180°) from the listener.

Similarly, the amplitude of the audio of the third participant P3 in the mix intended for the participant of focus P1 in FIG. 2 can be modified by:

Amplitude=Amplitude normalized to one unit of distance $(1/d_2)^2$.

Also, the amplitude of the audio of the third participant P3 in the mix intended for the participant of focus P1 in FIG. 2 can be modified by:

Amplitude=Amplitude($|\cos \theta_3/2|$)+C

Note that for multiple servers, e.g., two for illustration with eight example participants (and thus seven audios in each tailored mix), four of the participants can send their audio and pose data to one server and four to the other server. The servers can exchange their received audio and pose data between them and each respectively generate the final mixed signal for the participants for which they're responsible for providing audio (the participants that are respectively closest to one server or the other). Alternatively, each participant can receive separate "final" audio and pose signals from the two servers (a final audio+pose signal for four streams from one server, a final audio+pose signal for three streams from the other server, omitting the receiving participant's own audio), which would reduce the requirements on each server and be mixed locally at the participant's device using principles above.

Note further that in the example above, the delays for each non-test participant audio that are tailored for the test participant are calculated at the server. In an alternative example, the non-test participant audio streams for each test participant may be encoded at the server such that the server compresses all audio and sends as a unique bundle to each test participant, but the delays may not be determined by the server. Instead, the server does not send channel audio with calculated delays, but simply compresses all streams as received together, sending them to the test participant's local device, which decodes the stream and generates the channelized delays using the above principles.

Figure 6:
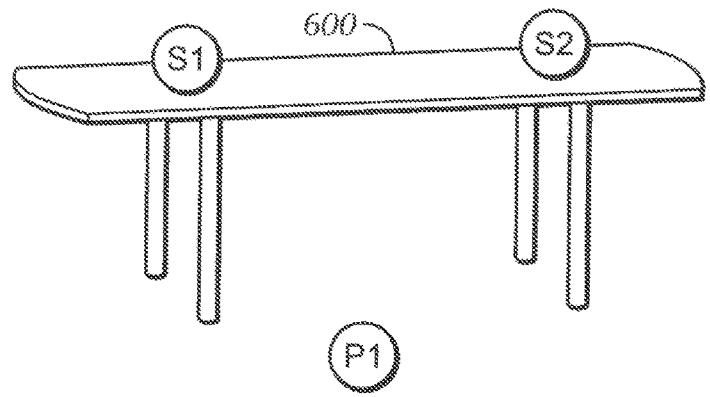
FIGS. 6-8 are schematic diagrams showing participant speaker arrangements in various embodiments.
Figure 7:
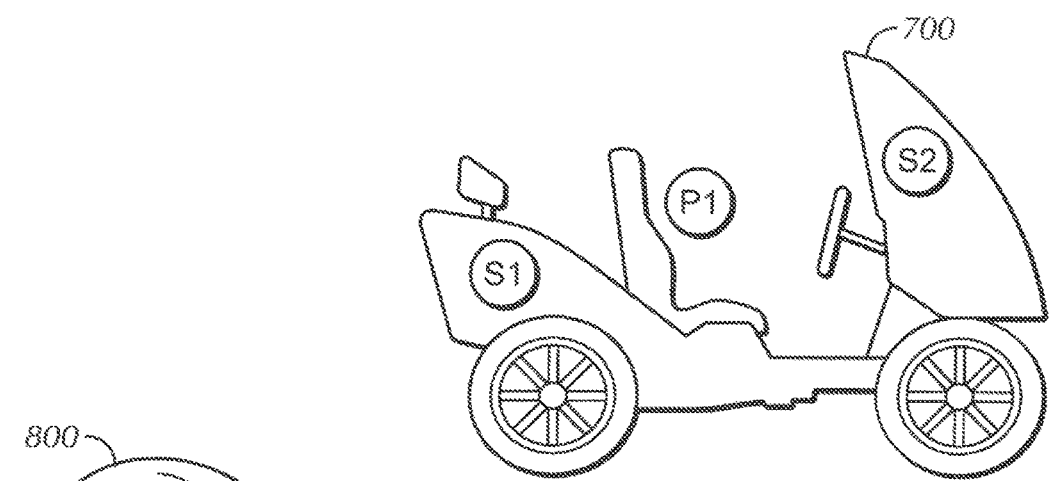
Figure 8:
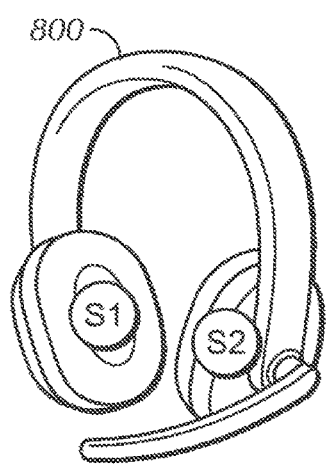

FIGS. 6-8 illustrate various chat participant speaker layouts that may be used. In FIG. 6, the participant of focus P1 is located in a conference room with a conference table 600 on which are placed multiple speakers S1, S2 for which the chat audio of other participants is calculated is played. In some examples, only a single surround sound speaker may be used. In FIG. 7, the participant of focus P1 is located in a computer game vehicle 700 on which are placed multiple speakers S1, S2 for which the chat audio of other participants is calculated is played. In FIG. 8, the participant of focus wears a computer game headset 800 on which are placed multiple speakers S1, S2 for which the chat audio of other participants is calculated is played.

Figure 9:
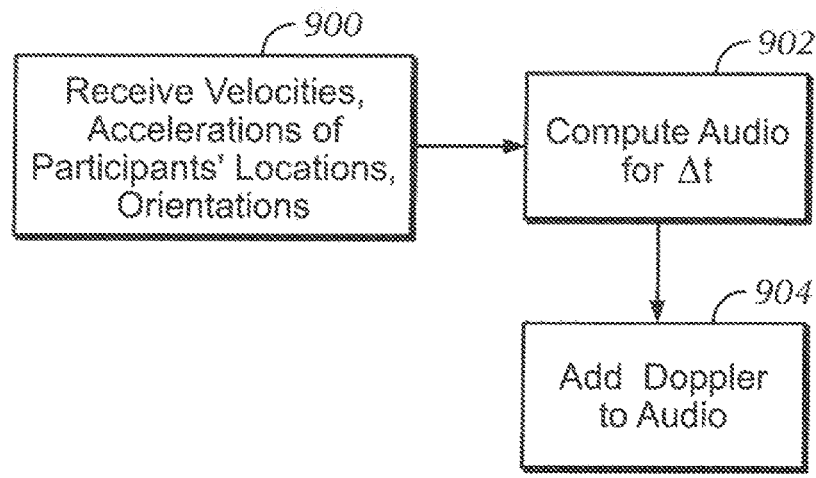
FIG. 9 is a flow chart of example logic in an embodiment to predict participant future orientation.

FIG. 9 illustrates additional logic that uses predictions of a participant's likely pose in the near future to determine the delays and amplitude modifications noted above. Commencing at block 900, the determining processor (either the participant's local device or the server) receives linear and angular velocities and if desired linear and angular accelerations of a participant using any of the inputs (real world accelerometers or virtual world behavior) described above and amplified on further below. Using this motion information, at block 902 the participant's pose at some time Δt in the future is determined. If desired, the audio delays and amplitude modifications are then calculated prospectively for the future time Δt and provided prior to the future time for play at the future time to reduce latency. Also, as indicated at block 904 in FIG. 9, using the received motion information, Doppler effects can be added to the audio.

Accordingly, in some examples the motion information in FIG. 9 can be participant acceleration and velocity of one or both participant movement and participant virtual character movements. When both actual and character motion are used, like parameters from the physical and virtual world may be additive.

Additionally, the predictive pose information derived from the motion information may be limited to account for the fact that the human head can rotate only a limited number of degrees relative to the body (particularly if for instance, sitting upright in a chair or in another known orientation). Consequently, any predicted rotation/movement beyond the predicted/known movement range may be ignored.

When virtual velocity/acceleration of a game character is used above, motion data can be sent from the participant's game console to the server, or computed by the server so that audio of a user (when presented as if coming from the respective user's virtual character) can be mimicked using a Doppler effect. Reverberation may also be used to generate a rich audio signal based on the shape and size of the room the person is sitting in, and on different materials in the room, as input by the participant or determined automatically. The present assignee's USPP 2015-0208187, U.S. Pat. No. 9,288,597, and U.S. patent application Ser. No. 15/019,111, all incorporated herein by reference, disclose methods for determining room boundaries.

In alternate embodiments, the pose of a participant at a future time may be determined using eye tracking of the participant based on object recognition executed on images of the participant's eyes from a camera in, e.g., the headset 46 of FIG. 1. And/or, an object in the virtual world at which the participant is looking may be used to identify or predict head orientation. For instance, if a bird is flying across the screen left to right, the participant's attention will likely follow the bird. Yet again, keywords spoken by the participant may be recognized using word recognition software and correlated to an intention to look in a particular direction in the near future. And/or, a history of a speaker and whether the participant would look at that speaker when speaking (in the real world or the virtual world) may be used to project a future pose of the participant. Similarly, upcoming spectacular events in a computer game being viewed by the participant that are likely to attract the attention of the participant can be used to predict the future pose information. Furthermore, it can be predicted that, even if the participant is wearing a VR headset, the participant will nonetheless turn to face a speaker in the real world room with the participant that speaks and hence binaural audio can be adjusted accordingly.

Figure 10:
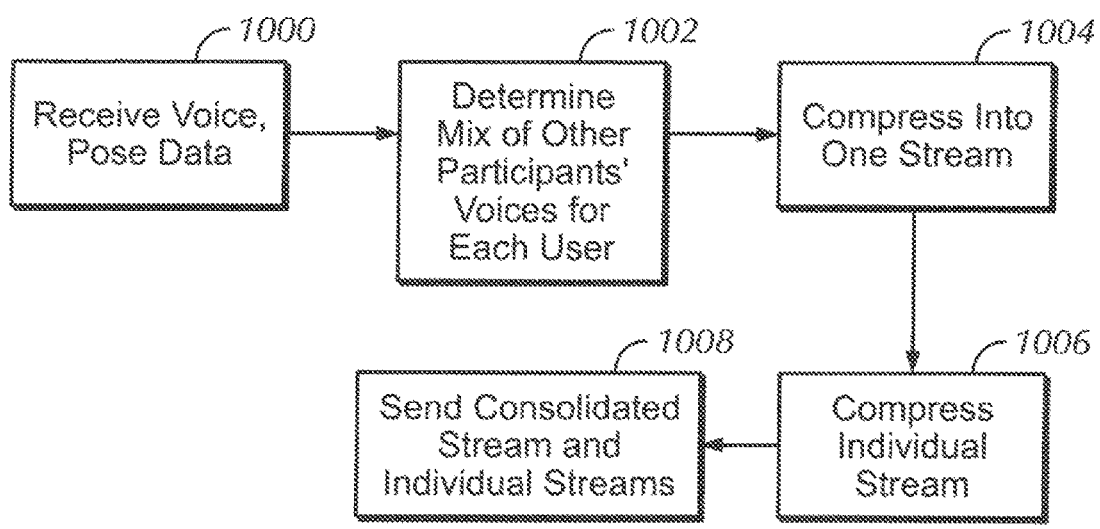
FIG. 10 is a flow chart of example server logic using a consolidated mix stream and multiple individual voice streams.
Figure 11:
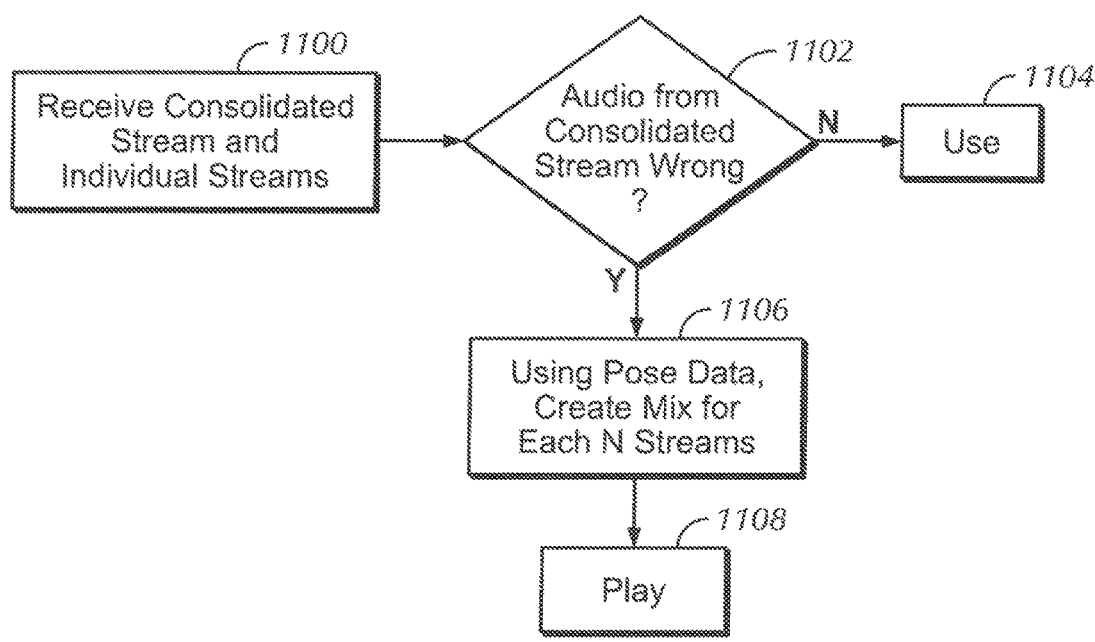
FIG. 11 is a flow chart of example participant-side logic for the embodiment of FIG. 10.

FIGS. 10 and 11 illustrate alternative examples in which the server not only generates and sends a single consolidated stream tailored to each participant but also an individual stream that is used to constitute the consolidated stream, for what might be considered auditing purposes.

Specifically, commencing at block 1000 of FIG. 10, the server can receive the pose and voice information from each participant as discussed above and as also discussed above, at block 1002 determine the delay-adjusted mixes of non-test participants for each test participant's tailored stream. The tailored compressed streams are consolidated at block 1004 into a single audio stream as discussed previously.

However, at block 1006 at least one individual non-test participant audio stream Is compressed if not already compressed and at block 1008, the consolidated single stream and the individual audio stream is sent to each respective test participant.

FIG. 11 illustrates how these streams may be used by the device of the test participant (participant in focus). At block 1100 the consolidated stream and individual streams are received. This could be helpful if the server determines it knows the correct binaural sound to present, and if the participant's device, using the single participant stream as a test at decision diamond 1102, determines the server is correct by determining whether the single participant stream satisfies a threshold accuracy, the server's consolidated stream is used at block 1104 to extract and play the channelized audio for all of the non-test participants.

However, if the test at decision diamond 1102 indicates that the server's determinations fail to meet a threshold accuracy, the participant's device generates its own binaural audio at block 1106 using the pose information and audio from the other participants.

The test at decision diamond 1102 may simply be responsive to playing the single participant stream and receiving user input to indicate whether the user finds the audio acceptable or not. Or, the test may be performed by independently calculating the delays for the single participant audio and comparing the "mirrored" single participant audio generated by the participant's device to the single participant audio received from the server.

Figure 12:
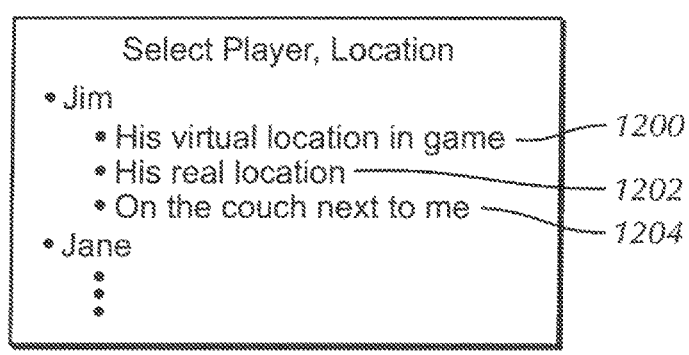
FIG. 12 is an example screen shot of a user interface (UI) that can be provided to enable a chat participant to define locations of other chat participants.

As discussed above, a participant's location may be in the real world, the location of his character in a virtual computer game space, or in a user-defined location. FIG. 12 illustrates a UI that may be used to enable a participant to select, for each other participant, whether be wants that other participant's voice to sound as if it emanates from the location of the other participant's character in a computer game (1200), or whether be wants that other participant's voice to sound as if it emanates from the actual physical location of the other participant (1202), or whether be wants that other participant's voice to sound as if it emanates from a user-selected location (1204).

The chat server can know a "special build" of the game that's generated based on the number of players to play in a particular instance. Speech recognition and synthesis may be used, as well as speech translation if players are speaking in different languages. No matter the language, the generated signal can sound like the actual person's voice, the voice of the character they are playing, or even be obfuscated such that if the player is a child, other players don't know it's a child and hence the child's identity is protected.

Figure 13:
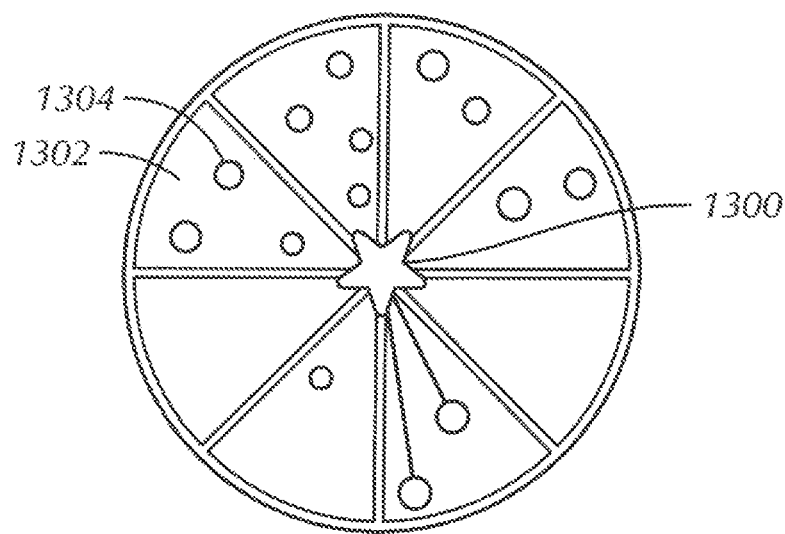
FIGS. 13-15 are schematic diagrams illustrating how participants can be grouped into geometric segments for bandwidth conservation.
Figure 14:
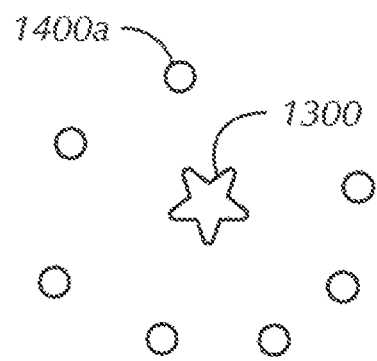
Figure 15:
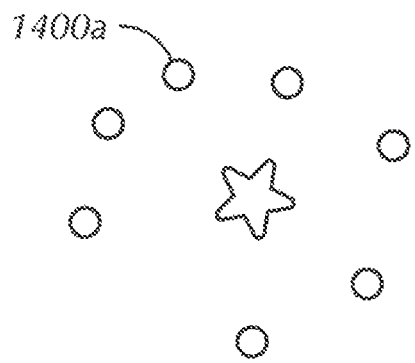

Attention is now directed to FIGS. 13-15. As understood herein, it may be problematic to generate an exact 3D audio signal for a participant because be may move his head at the last moment and things would sound like they came from the wrong place.

Accordingly, as indicated in FIG. 13, for a participant 1300 (indicated by a star) the azimuthal virtual or real space around the participant can be divided into pie-shaped segments 1302. The audio from all participants 1304 within each segment 1302 is combined into a respective combined audio stream for that segment 1302. The aggregated signals for each segment 1302 are then transmitted by the server to the device of the participant 1300 along with the identification of the associated segment. The device of the participant 1300 treats each aggregated segment signal as a single sound source from the center line of the respective segment. This allows aggregating of a large number of sound sources down to a smaller number of sound sources where the sound comes from "generally" the right place, in other words, in FIG. 13 the audio of voices in a segment are combined into a single sound and if desired, each is attenuated by its distance to the listening player. Note that some of the participants 1304 are closer to the listening participant 1300 and some are further away.

In FIG. 14, each dot 1400 represents the single aggregated audio for all the participants in the respective segment, and is considered to be located on the centerline of the respective segment. The dot 1400A is specifically represented for disclosure purposes to illustrate what happens if the participant 1300 turns his head from the orientation diagrammed in FIG. 14 to the one diagrammed in FIG. 15. In FIGS. 14 and 15, the space has been divided into eight segments 1302 so that the device of the listening participant 1300 receives eight aggregated streams. The device of the listening participant 1300 treats the eight streams as eight distinct sounds and uses binaural or 3D audio techniques to combine them such that fee sounds sound like they are coming from their corresponding direction. Since the individual player voices are attenuated based on their distances when creating the aggregate sounds, distance information isn't used in this final mixing.

Understanding that a person can torn his head a fair amount in a short period of time, but cannot traverse substantial distances in those short time periods, only changes in participant head orientation and not changes in participant location need be accounted for in some embodiments. Thus, in FIG. 15 it may be appreciated that the situation is illustrated in which the participant 1300 has turned his head 90° relative to FIG. 14. Because of that, the device of the participant 1300 mixes the sound sources as indicated in FIG. 15 since the locations of the modeled aggregated sound sources correspond more accurately to the directions of the other players now that the participant 1300 has rotated his head.

In an embodiment implementing aggregation by a server of multiple chat participant voices, each participant's device can record the participant's voice with a time stamp. Also, as described above each participant's device can transmit pose information pertaining the participant along with the time stamp and voice signal to a server, which aggregates all signals into an array of sectored signals according to disclosure above. The sectors may be sectors in a two dimensional or three dimensional array of positional regions. The server transmits back the aggregated signal to all participants including the time stamp for each participant's signal and their relative position within this combined signal. Then, the device of each participant receiving the aggregated signal refers to its own recording of the respective participant's voice and subtracts the respective participant's voice from the aggregated signal using both the time stamp and the positional modulation within the aggregated signal. Each participant's device then renders the combined aggregated signal (minus the respective participant's own voice) relative to the respective participant's own pose.

It will be appreciated that whilst present principals have been described with, reference to some example embodiments, these are not intended to be limiting, and that various alternative arrangements may be used to implement the subject matter claimed herein.

What is claimed is:

1. A device comprising:
    at least one computer memory that is not a transitory signal and that comprises instructions executable by at least one processor to:
    receive from respective first, second, and third participants, respective first, second, and third pose information associated with the first, second and third participants, at least the first pose information comprising geographic location of the first participant and orientation in which the first participant is facing;
    receive respective first, second, and third voice signals indicating speaking of the respective first, second and third participants;
    for the first participant, combine the second and third voice signals at least in part using the first pose information associated with the first participant;
    provide the first stream to a first speaker system associated with the first participant for playing thereon;

for the second participant, combine the first and third voice signals into a second stream at least part using the second pose information associated with the second participant;

provide the second stream to a second speaker system associated with the second participant for playing thereon;

for the third participant, combine the second and first voice signals into a third stream at least in part using the third pose information associated with the third participant;

provide the third stream to a third speaker system associated with the third participant for playing thereon;

aggregate voice signals for the first stream in geometric sectors centered on a location; and provide the first speaker system associated with the first participant a respective single aggregated stream for each respective sector in which a participant other than the first participant is located, wherein at least a first one of the single aggregated streams for at least a first one of the sectors represents voice signals from plural participants and at least a second one of the single aggregated streams for at least a second one of the sectors represents voice signals from at least one participant not represented in the first aggregated stream.

2. The device of claim 1, comprising the at least one processor.

3. The device of claim 1, wherein the device includes a server configured for receiving the pose information and voice information from respective first, second, and third devices associated with the first, second, and third participants.

4. The device of claim 1, wherein the device includes a computer simulation apparatus associated with at least one of the participants.

5. The device of claim 1, wherein the instructions are executable to:
modify at least the second voice signal for the first stream based at least in part on a distance between the first and second participants.

6. The device of claim 5, wherein the distance is a distance in the physical world between the first and second participants.

7. The device of claim 5, wherein the distance is a distance in a virtual space between respective first and second virtual characters associated with the first and second participants.

8. The device of claim 1, wherein the instructions are executable to:
modify at least the second voice signal for the first stream based at least in part on orientation information in the second pose information associated with the second participant.

9. The device of claim 1, wherein the first pose information comprises first orientation information representing an orientation of a head of the first participant, and the instructions are executable to:
for the first participant, combine the second and third voice signals but not the first voice signal into the first stream at least in part using the first orientation information associated with the first participant.

10. The device of claim 1, wherein the speaker systems include respective virtual reality (VR) and/or augmented reality (AR) headsets and/or headphones.

11. The device of claim 1, wherein the instructions are executable to:
modify at least the second voice signal for the first stream based at least in part on a velocity associated with at least one of the first or second participants, the velocity representing a real or virtual world velocity of the first or second participant.

12. A computer-implemented method comprising:
receiving voice signals from participants in a group chat;
providing to a respective device of each receiving participant in the group chat an audio stream representing voices of plural other participants in the chat modified to account for a head orientation of the receiving participant; and
modifying at least one audio stream of at least a first of the plural other participants based at least in part on at least one prediction of a participant's pose in the future.

13. The method of claim 12, comprising using a server to execute the receiving and providing steps.

14. The method of claim 13, wherein the server includes a computer simulation apparatus.

15. The method of claim 12, comprising modifying at least one audio stream of at least a first of the plural other participants based at least in part on a distance, wherein the distance is a distance in the physical world between the first and second participants.

16. The method of claim 12, comprising modifying at least one audio stream of at least a first of the plural other participants based at least in part on a distance, wherein the distance is a distance in a virtual space between respective first and second virtual characters associated with the first and second participants.

17. The method of claim 12, wherein at least some of the respective devices associated with respective receiving participants in the group chat include respective virtual reality (VR) and/or augmented reality (AR) headsets and/or headphones.

18. The method of claim 12, comprising modifying at least one voice signal based at least in part on a velocity associated with at least one of the participants, the velocity representing a real or virtual world velocity of the first or second participant.

19. The method of claim 12, comprising:
aggregating voice signals in an audio stream in geometric sectors centered on a location associated with the receiving participant to whom the audio stream is to be provided; and
providing a respective single aggregated stream for each respective sector in which a participant other than the receiving participant is located.

* * * * *